(12) United States Patent
Hains et al.

(10) Patent No.: US 7,965,422 B2
(45) Date of Patent: Jun. 21, 2011

(54) SUPER RESOLUTION ENCODED MICROPRINTING THROUGH POSTSCRIPT

(75) Inventors: Charles M. Hains, Altadena, CA (US);
James R. Low, Rochester, NY (US);
Reiner Eschbach, Webster, NY (US);
Jon McElvain, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1331 days.

(21) Appl. No.: 11/414,576

(22) Filed: Apr. 28, 2006

(65) Prior Publication Data

US 2007/0252838 A1    Nov. 1, 2007

(51) Int. Cl.
*H04N 1/40* (2006.01)
*G06F 3/12* (2006.01)
*G06F 15/00* (2006.01)
*G06K 1/00* (2006.01)
*G06K 15/00* (2006.01)
*G06K 9/36* (2006.01)
*G06K 9/46* (2006.01)
*G06K 9/03* (2006.01)
*G06K 9/32* (2006.01)
*G06T 11/00* (2006.01)

(52) U.S. Cl. ........ 358/3.28; 358/1.1; 358/3.16; 382/296; 382/232; 382/309; 345/467; 345/468; 345/471

(58) Field of Classification Search .......... 358/1.2, 358/1.6, 1.11, 1.14, 1.15, 1.16, 1.18, 426.01, 358/3.28, 3.27, 3.06, 468, 3.16, 1.9, 1.1; 382/232, 162, 168, 173, 175, 176, 177, 178, 382/181, 251, 244, 255, 276, 293, 296, 209, 299, 282, 309; 345/467, 468, 471

See application file for complete search history.

(56) References Cited

U.S. PATENT DOCUMENTS

| | | | | |
|---|---|---|---|---|
| 4,285,049 A * | 8/1981 | Bird et al. | ..................... | 711/156 |
| 4,555,802 A | 11/1985 | Fedak et al. | | |
| 5,371,798 A * | 12/1994 | McWhortor | .................... | 380/51 |
| 5,483,622 A * | 1/1996 | Zimmerman et al. | ....... | 358/1.15 |
| 5,630,028 A | 5/1997 | DeMeo | | |
| 5,673,064 A | 9/1997 | Seto | | |
| 5,724,455 A * | 3/1998 | Eschbach | ..................... | 382/260 |

(Continued)

FOREIGN PATENT DOCUMENTS

JP    8030596    2/1996

OTHER PUBLICATIONS

European Search Report—Oct. 31, 2008.

(Continued)

*Primary Examiner* — Twyler L Haskins
*Assistant Examiner* — Jonathan R Beckley
(74) *Attorney, Agent, or Firm* — Fay Sharpe LLP (57) ABSTRACT

A system facilitates printing of microtext. A processing component allows a user to create one or more microtext characters, wherein the characters are output as a data packet. An SRE code store receives and associates one or more SRE codes with the data packet, each SRE code is representative of a bit pattern, wherein the bit pattern is a grid of bits that are filled to create a particular pattern. A font bank receives the one or more SRE codes from the SRE code store and defines such codes via a font. A raster image processor receives the font from the font bank, decodes the font and outputs instructions to print the microtext.

17 Claims, 7 Drawing Sheets

U.S. PATENT DOCUMENTS

| | | | |
|---|---|---|---|
| 6,020,979 A | 2/2000 | Zeck et al. | |
| 6,438,273 B1* | 8/2002 | Loce et al. | 382/296 |
| 6,782,142 B2* | 8/2004 | Loce et al. | 382/296 |
| 6,867,872 B1 | 3/2005 | Kurihara et al. | |
| 7,196,822 B2* | 3/2007 | Hu | 358/3.16 |
| 7,270,918 B2* | 9/2007 | Blood et al. | 430/10 |
| 7,532,366 B1* | 5/2009 | Yang et al. | 358/3.28 |
| 7,580,153 B2* | 8/2009 | Eschbach et al. | 358/1.9 |
| 7,636,480 B2* | 12/2009 | Zhang et al. | 382/232 |
| 2005/0134884 A1* | 6/2005 | Rombola et al. | 358/1.11 |
| 2005/0142468 A1* | 6/2005 | Blood et al. | 430/10 |
| 2005/0142469 A1 | 6/2005 | Blood et al. | |
| 2006/0069992 A1 | 3/2006 | Hodder | |
| 2006/0250656 A1* | 11/2006 | Plutchak | 358/3.28 |
| 2007/0139681 A1* | 6/2007 | Eschbach et al. | 358/1.11 |
| 2008/0219736 A1* | 9/2008 | Lynggaard | 400/76 |

OTHER PUBLICATIONS

Loh, Nick, Tony Brown, "making the most of *hp* indigo digital presses," The Designer's Guide, pp. 1-56, Hewlett-Packard Company 2003.

American Bankers Association "Check Security Guideline(X9/TG-8)" Published 1995 (Revised 2001).

* cited by examiner

```
The letter "R" can be defined as a Type 3 font in Postscript via
/R {
   [1.0 0.00 0.00 1.0 0.00 0.00] concat
   /ImageDict 11 dict def
   ImageDict begin
      /ImageType 1 def
      /Width 7 def
      /Height 7 def
      /BitsPerComponent 8 def
      /ImageMatrix [7.0000 0.0000 0.0000 -7.0000
      0.0000 7.0000] def
      /DataSource <
      803fe04ff2900000ff83136110783142170 37f9520cff
      850aa0d0c8ac4e130b808
 > /LZWDecode filter def
      /MultipleDataSources false def
      /Decode [ 0 1 ] def
   end
   ImageDict image
}bind def
```

*FIG. 4*

```
Type 3 SRE Font Definition
%!PS
   8 dict
   begin
   /FontType 3 def
   /FontBBox [ 0 0 1.0 1.0] def
   /FontMatrix [ 1.0 0 0 1.0 0 0 ] def
   /BuildGlyph
      {1.0 0.0 setcharwidth
      exch /CharProcs get exch
      2 copy known not
         {pop /.notdef}
         if
      get exec
      }bind def
   /BuildChar {1 index /Encoding get exch get
      1 index /BuildGlyph get exec
      }bind def
   /Encoding StandardEncoding def
   /CharProcs 100 dict def
   CharProcs begin
   /.notdef {}def
   /A {
      [1.0 0.00 0.00 1.0 0.00 0.00] concat
      /ImageDict 11 dict def
      ImageDict begin
         /ImageType 1 def
         /Width 7 def
         /Height 7 def
         /BitsPerComponent 8 def
         /ImageMatrix [7.0000 0.0000 0.0000 -7.0000 0.0000
         7.0000] def
         /DataSource <
         8000020ff7f8a801076e2110e8483801fe0085c1e070486
         a1da60012c3c010983c161c2d83b4219010
         > /LZWDecode filter def
            /MultipleDataSources false def
            /Decode [ 0 1 ] def
         end
         ImageDict image
   }bind def
   /B {
      [1.0 0.00 0.00 1.0 0.00 0.00] concat
      /ImageDict 11 dict def
      ImageDict begin
         /ImageType 1 def
         /Width 7 def
         /Height 7 def
         /BitsPerComponent 8 def
         /ImageMatrix [7.0000 0.0000 0.0000 -7.0000 0.0000
         7.0000] def
         /DataSource <
         803fe04ff2900000ff83136110783141a70681bfc551
         084c2e16508b40ca906808
         > /LZWDecode filter def
            /MultipleDataSources false def
            /Decode [ 0 1 ] def
         end
         ImageDict image
      }bind def
```

SUPER RESOLUTION ENCODED MICROPRINTING THROUGH POSTSCRIPT

BACKGROUND

The following relates to microprinting text. It finds particular application to the creation of microprinting features on a device that supports super resolution encoding and decoding utilizing standard postscript processes.

Microprinting is commonly utilized in anti-counterfeiting applications. Micro text can be placed in particular locations on currency, identification papers, or other documentation to provide various types of information. Microprinting involves printing very small text, usually too small to read with the naked eye, onto the note or item. Microprint is frequently hidden in an inconspicuous, unnoticeable area on the note or item. For example, on the series 2004 United States $20 bill, microprint is hidden within the border in the lower left corner of the obverse (front) side as well as the Twenty USA background. However, microprint is sometimes placed in a prominent location on the item, and may even be labeled with an MP symbol as a warning that the note or item contains microprinting.

Microprinting works as an anti-counterfeiting feature through the fact that text of such small size is very difficult to reproduce accurately during attempts to counterfeit the note or item on which it is printed. When the note or item is placed in a photocopier or computer scanner, a line of microprint text will appear to the copier or scanner as a dotted line, which will then appear in the same manner on the counterfeit note or item when it is printed. Likewise, attempts to counterfeit using a printing press do not accurately reproduce the microprint, because the text is too small to engrave into the printing plates using methods available to the general public and to counterfeiters. Thus, microprinting ultimately serves to confirm the fact that the note or item on which it is printed is genuine.

Super resolution encoding (SRE) codes have been employed to microprint text on a recipient. An SRE code is a higher level resolution that is represented by a lower level number of bits. The SRE code can be associated with a particular bit pattern that is printed on a document. One drawback utilizing an SRE font is that SRE codes have to be communicated to a raster output scanner wherein a raster image processor analyzes all received data. In a simple scenario, a text string is converted to one or more SRE codes offline by creating an image and by sending the image through as raw data. Such an approach, however, can be inefficient, slow and cumbersome.

In another approach, an SRE font can be employed. However, common fonts define an outline and a color that is poured throughout that outline. In one approach, the color can have a spatial structure associated with it. However, the problem with this approach is that every single letter must be created as a separate pattern ink.

Thus, processes and/or systems that microprint can be limited in their ability to print microtext characters. What are needed are processes and/or systems that overcome shortcomings associated with the generation, processing and implementation of microtext in printing applications.

BRIEF DESCRIPTION

In one aspect, a system facilitates printing of microtext. A processing component allows a user to create one or more microtext characters, wherein the characters are output as a data packet. An SRE code store receives and associates one or more SRE codes with the data packet, each SRE code is representative of a bit pattern, wherein the bit pattern is a grid of bits that are filled to create a particular pattern. A font bank receives the one or more SRE codes from the SRE code store and defines such codes via a font. A raster image processor receives the font from the font bank, decodes the font and outputs instructions to print the microtext.

In another aspect, a method is employed that defines microtext as a Postscript Type 3 font. Microtext is created on a processing component. The microtext is associated with one or more SRE codes and defined as a SRE Postscript Type 3 font. The SRE Type 3 font is transmitted to a print engine.

In yet another aspect, a method is employed to print microtext. A SRE Type 3 font is received which includes information related to one or more properties of at least one microtext character. The SRE Type 3 font is decoded in a lossless manner to extract the information related to the one or more properties of the at least one microtext character. The one or more SRE code sequences are identified, wherein each SRE code in the one or more sequences is related to a bit pattern. Microtext based at least in part upon the SRE codes identified is printed.

DETAILED DESCRIPTION

Figure 1:
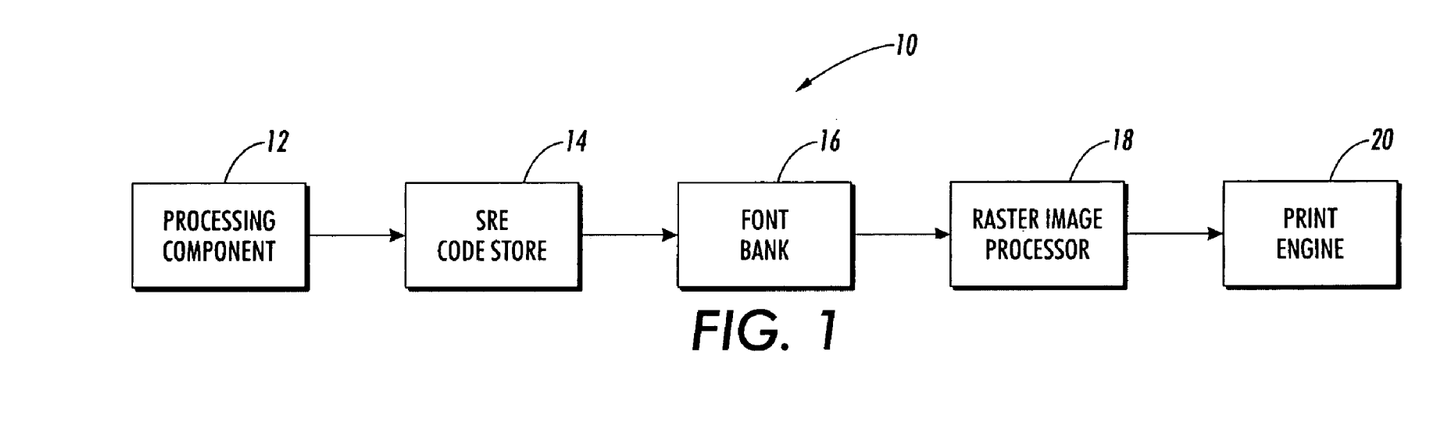
FIG. 1 illustrates a system that prints microtext in accordance with an exemplary embodiment.

FIG. 1 illustrates a system 10 that prints microtext. The system 10 includes a processing component 12, an SRE code store 14, a font bank 16, a raster image processor 18, and a print engine 20. The processing component can include software that allows a user to create, edit, store, and retrieve data associated with printing microtext on a recipient. For example, the processing component 12 can be a personal computer, a laptop computer, a tablet computer, a cell phone, a personal digital assistant, etc. In one embodiment, the processing component employs specific word processing software that allows a user to create text of substantially any size and to place such text in a location, as desired. In one example, a microtext string is created that is placed in a particular location in a security printing application.

The processing component 12 can accept one or more inputs utilizing peripheral devices (not shown). For example, a keyboard and/or mouse can be coupled to the processing component 12 to allow communication between the processing component 12 and one or more parties. In order to facilitate such communication, the processing component 12 can include one or more ports (not shown) that communicate utilizing substantially any protocol and/or standard. For example, the processing component can communicate utilizing USB, PS/2, serial, and/or parallel communication ports. In this manner, the processing component 12 can accept data input from a user and output data to a recipient utilizing the one or more communication ports. For instance, a user can create a microtext string utilizing the processing component 12 and output the microtext string data to a recipient for further processing.

The super resolution encoding (SRE) code store 14 can include one or more SRE codes. The SRE codes can be associated with a particular font, which can be supported by a print engine. In one example, an SRE code is an eight bit number with an associated four by four bit pattern. An SRE code can provide a more granular resolution than available utilizing conventional means. For instance, utilizing SRE, an eight bit code at six hundred dots per inch (dpi) can represent a sixteen bit pattern at two thousand four hundred dpi.

In one example, the SRE codes are not available for all possible sixteen bit patterns. For instance, in a sixteen bit pattern (e.g., four by four bits), there are sixty five thousand five hundred and thirty six disparate patterns possible. However, in the interest of efficiency and further in view of the relatively small size of the text (e.g., less than one point), a limited set can be utilized. Such small text size can ameliorate the need for a large variety of possible patterns, since such miniscule differences can be indistinguishable to the human eye. In one approach, two hundred and fifty six patterns are available in a four by four bit field, wherein each pattern is associated with a particular SRE code.

The SRE code store 14 can include a lookup table or other means that associates an SRE code with a bit pattern. The SRE codes can be assigned to a bit pattern based upon the number of bits filled within a particular pattern. For example, SRE code '0' can have zero bits filled, code '45' can have four bits filled, SRE code '132' can have eight bits filled, etc. in a particular configuration. The SRE codes can be accessed and employed based upon what is needed for a particular text string.

The SRE code store 14 can determine the SRE codes, and their location based upon a particular text string. For instance, the processing component 12 can generate one or more SRE codes based at least in part upon the microtext created by a user. In one example, a microtext string that reads 'one dollar' is created. A particular set of SRE codes can be employed to create each letter in the text string. In addition, this set of SRE codes can be ordered in such a manner to properly construct each character.

Various grid sizes can be employed to create each character. In one approach, a grid three pixels wide by five pixels high can be employed to represent each character. Each pixel in the grid is associated with a four by four bit pattern, as noted above. Thus, a character that is five pixels high at six hundred dots per inch represents twenty pixels at two thousand four hundred dots per inch. Thus, a character can be represented by fifteen SRE codes that are appropriately located within a three by five pixel grid. It is to be appreciated that any number of pixels can be employed to create a character. In addition, the SRE codes can be modified to accommodate any size character font. For example, the number of pixels can be increased to vary character size height and/or width.

Such location and selection of appropriate SRE codes can be performed by the SRE code store 14 utilizing an algorithm, an instruction set, a process, an application, a look-up table, etc. For instance, when the SRE code store 14 receives a letter 'H' from the processing component 12, the appropriate SRE code set can be accessed. In one aspect, each character can be associated with a particular SRE code set. In another aspect, an algorithm can be employed to assemble an unrecognized character upon receipt. In this manner, the SRE code store 14 can receive a text string from the processing component 12 and output a string of SRE codes employed to create each character in the text string. In another example, graphics, or other non-text embodiments can be created utilizing one or more SRE codes.

The font bank 16 receives one or more SRE codes from the SRE code store 14 and defines such codes via a particular font (e.g., an SRE font). In one example, the font is a Type 3 font capable of providing information via a PostScript® language that describes the appearance of text and/or graphics on a page. The PostScript® code can define the location, height, width, number of bits used, etc. of one or more microtext characters. In addition, one or more bit patterns and their associated locations can be specified, wherein the bit patterns are employed to construct the one or more characters. In one embodiment, the bit patterns are specified via one or more SRE codes. The SRE codes can be embedded in the PostScript® code utilizing hexadecimal, binary, decimal, etc. representations.

A raster image processor or equivalent can receive PostScript information and instruct a print engine on the type and location of one or more dots. In this manner, a particular format and/or protocol is followed to incorporate the SRE code data into a form that is readily interpreted by a print engine. Such a print engine may require support of super resolution encoding and/or decoding to extract various information.

In one approach, transmission of the SRE font is lossless to allow proper decoding of the SRE fonts. Lossless transmission can allow all information contained in the SRE codes to be maintained to maintain the integrity of the data contained therewith. In this manner, various artifacts associated with lossy compression schemes (e.g., JPEG) can be eliminated. Lossless transmission can be maintained via hints (or equivalents) associated with the SRE fonts to specify lossless compression.

As noted, utilizing SRE fonts includes one or more particular SRE codes to construct each microtext character. Thus, the SRE font can allow character translations, but not character rotation. Such aspect is true because an SRE sequence for a font represents a series of fixed patterns (e.g., 2400 by 2400) that may not produce the same rotated pattern when applying a spatial rotation to the font block. Therefore, a ninety-degree rotated version of a particular character will necessarily involve an entirely different sequence of SRE codes.

The raster image processor (RIP) 18 is a component that can produce a bitmap which is then sent to the print engine 20. The input may be a page description in a high-level description language such as PostScript, Portable Document Format, XPS or other bitmap of higher or lower resolution than the print engine. The RIP 18 can apply smoothing and/or interpolation algorithms to an input bitmap to generate an output bitmap. The RIP 18 can accomplish raster image processing to turn received vector digital information (e.g., a PostScript® file) into a high-resolution raster image. In other words, the RIP 18 can take digital information about fonts and graphics that describe the appearance of a file and translate it into an image composed of individual dots that a print engine can output. Data related to the Type 3 SRE font can be tagged such that the RIP 18 recognizes this data and utilizes it to transmit characters for microprinting.

The RIP 18 can be implemented in substantially any manner. For example, the RIP 18 can be a software component of an operating system, hardware component, or a firmware program executed on a microprocessor inside a printer. A hardware RIP can be a dedicated component configured to process digital files. In one embodiment, the RIP 18 is employed in a laser printer as a chip that communicates raster images to a laser. In this manner, the RIP 18 receives vector digital information (e.g., a PostScript® file) from the font bank 16 and transmits a set of instructions to the print engine 20.

The print engine 20 can be substantially any device that can print pages based on data received from one or more sources. The print engine 20 can be a platform that can print simplex and/or duplex pages with color, black and white, highlight color, etc. portions within each side of each page. In addition, the print engine 20 can include one or more independent modules (e.g., printers) that are interconnected in parallel and/or series to provide concurrent and/or serial processing of one or more jobs. Such modules may be independent in that each module is capable of processing a job(s) independently of the other modules. Each module can include one or more marking engines, and each marking engine can be associated with similar and/or different attributes (e.g., a processing rate, a type(s) of toner, etc.).

The print engine 20 can accept instructions from the RIP 18 and output a document based on such received instructions. The instructions can be related to the placement, size, and frequency of one or more dots on a document. Such dot placement can be accomplished utilizing one or more processes known in the art. For example, a xerographic process can employ a charged roller to place toner in particular locations on a recipient (e.g., paper, velum, acetate, etc.). Printing can be utilized in a security application such as a dollar amount on currency or a recipient's name printed as microtext to appear as an endorsement line on a check. In this manner, data received by the print engine 20 can be output as a hardcopy representation of received data. Additionally, the print engine might be a component of a copier or similar device.

Figure 2:
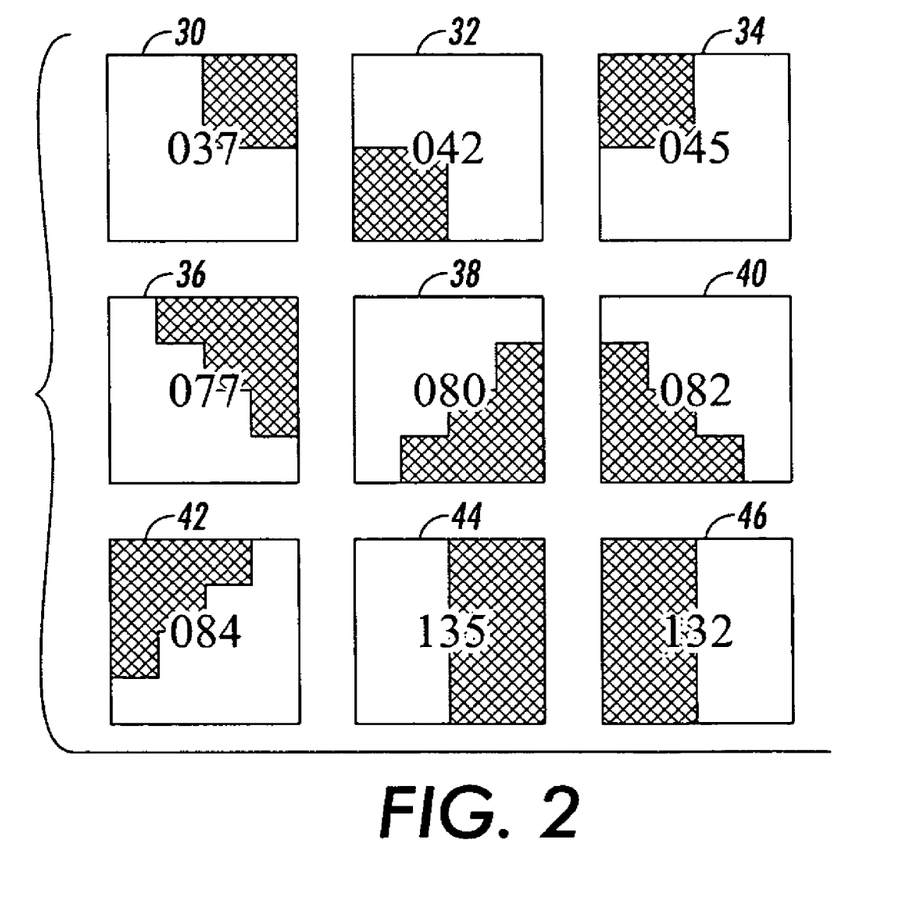
FIG. 2 illustrates several four bit patterns and their corresponding SRE codes in accordance with an exemplary embodiment.

FIG. 2 illustrates a plurality of exemplary four bit patterns 30, 32, 34, 36, 38, 40, 42, 44, and 46 and their corresponding SRE codes. As illustrated, each SRE code is associated with a grid that is four bits wide by four bits high. The grid has one or more bits that are completely filled or not filled at all. In this embodiment, the bits are square shaped. However, it is to be appreciated that the bits can be substantially any shape used to tile a plane, such as circular, triangular, elliptical, rectangles, hexagons, etc. In addition, the bit size can vary to accommodate substantially any font size.

The bit patterns 30-46 are four bits wide by four bits high, such that there are sixteen bits in each pattern. The bits are square shaped and the entire grid has a square shape. It is to be appreciated, however, that the grid can have substantially any shape. Bit pattern 30 has four bits in the upper right hand corner that are completely filled wherein the balance of the pattern is not filled. This exemplary bit pattern is associated with SRE code 037. Bit pattern 32 has four bits in the lower left hand corner that are completely filled wherein the balance of the pattern is not filled. This bit pattern is associated with SRE code 042. Bit pattern 34 has four bits in the upper left hand corner that are completely filled wherein the balance of the pattern is not filled. This bit pattern is associated with SRE code 045.

Bit pattern 36 has six bits in the upper right hand corner that are completely filled wherein the balance of the pattern is not filled. This bit pattern is associated with SRE code 077. Bit pattern 38 has six bits in the lower right hand corner that are completely filled wherein the balance of the pattern is not filled. This bit pattern is associated with SRE code 080. Bit pattern 40 has six bits in the lower left hand corner that are completely filled wherein the balance of the pattern is not filled. This bit pattern is associated with SRE code 040.

Bit pattern 42 has six bits in the upper left hand corner that are completely filled wherein the balance of the pattern is not filled. This bit pattern is associated with SRE code 084. Bit pattern 44 has eight bits on the right side that are completely filled wherein the left side of the pattern is not filled. This bit pattern is associated with SRE code 135. Bit pattern 46 has eight bits on the left side that are completely filled wherein the right side of the pattern is not filled. This bit pattern is associated with SRE code 132.

Figure 3:
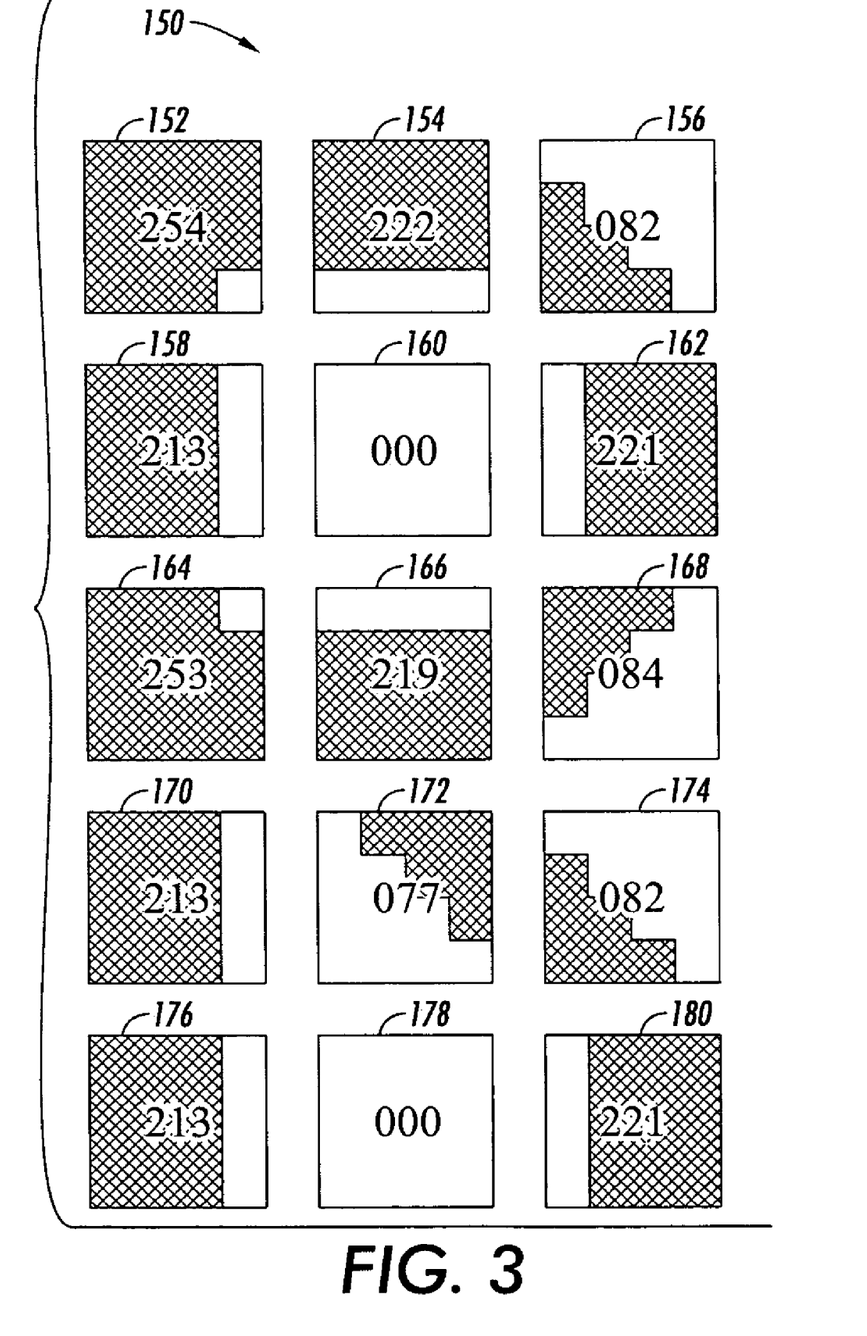
FIG. 3 illustrates a character formed from a plurality of SRE representations in accordance with an exemplary embodiment.

FIG. 3 illustrates a character 150 that is represented by a plurality of SRE representations 152, 154, 156, 158, 160, 162, 164, 166, 168, 170, 172, 174, 176, 178, and 180. As described in FIG. 2, each SRE representation 152-180 is associated with a particular SRE code and/or bit pattern. The character 150 can be sized based at least in part upon the number of pixels (SRE codes) employed to create the character. In this embodiment, the character 150 is created utilizing five SRE codes for height and three SRE codes for width, to create a fifteen pixel grid. Each bit pattern contains zero or more bits that are filled. The bit patterns associated with each SRE code can be arranged such that they are justified on the same side. For example, the bit patterns can all be aligned on the left side of each bit pattern. In this manner, the bits can line up in a desired configuration to provide specific graphical elements.

In one example, character 150 is a letter 'R.' The graphical elements to create the 'R' can be provided by the bit patterns associated with each SRE code 152-180. In this manner, each pixel can contain a particular number of bits that are filled in or not filled in. Although such associations are given, it is to be appreciated that the correlation between SRE representations and SRE codes is arbitrary. In other words, an SRE code can be related to substantially any bit pattern, as desired. To create the letter 'R,' the SRE representations can be associated with the following SRE codes.

SRE representation 152 is associated with SRE code 254;
SRE representation 154 is associated with SRE code 222;
SRE representation 156 is associated with SRE code 082;
SRE representation 158 is associated with SRE code 213;
SRE representation 160 is associated with SRE code 000;
SRE representation 162 is associated with SRE code 221;
SRE representation 164 is associated with SRE code 253;
SRE representation 166 is associated with SRE code 219;
SRE representation 168 is associated with SRE code 084;
SRE representation 170 is associated with SRE code 213;
SRE representation 172 is associated with SRE code 077;
SRE representation 174 is associated with SRE code 082;
SRE representation 176 is associated with SRE code 213;
SRE representation 178 is associated with SRE code 000;
SRE representation 180 is associated with SRE code 221.

Figure 4:
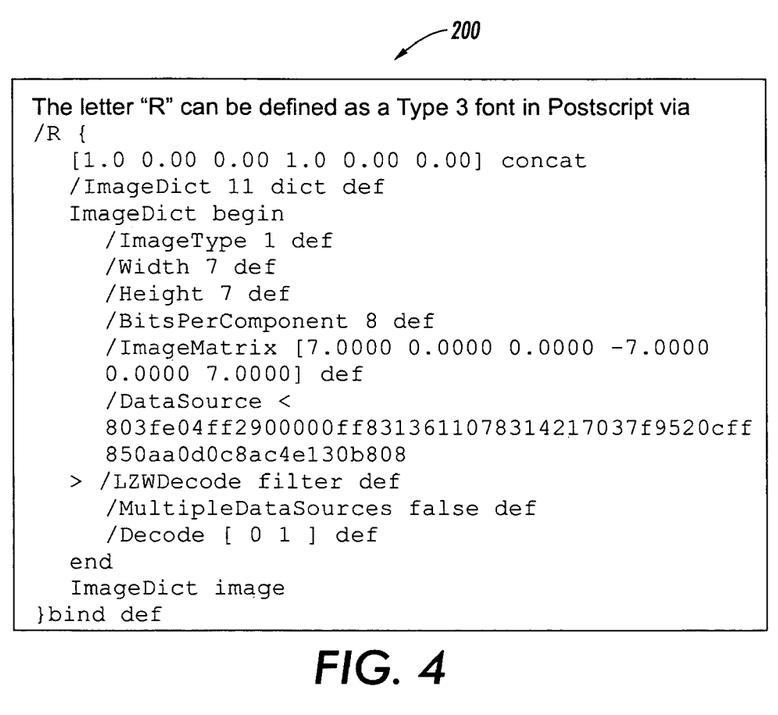
FIGS. 4 and 5 illustrate code that defines a character as a Type 3 font in accordance with an exemplary embodiment.
Figure 5:
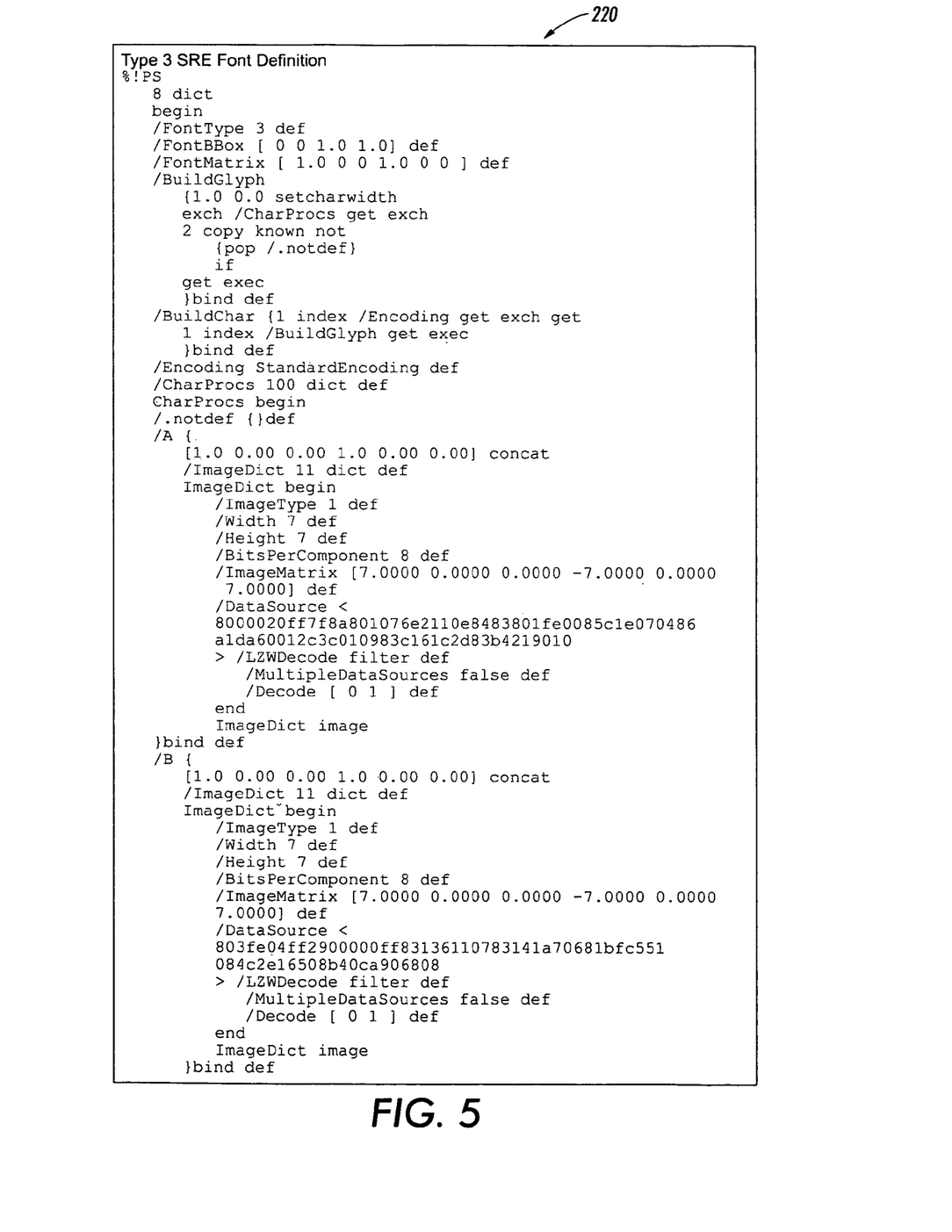

FIGS. 4 and 5 show codes 200 and 220 employed to define a character 'R' as a Type 3 font in PostScript®. In one embodiment, code 200 and/or code 220 can be generated by the font bank 16 and received by the RIP 18. The RIP 18 can decode the information in the code 200 and/or code 220 to create one or more microtext characters. The code 200 and/or code 220 can define the location, height, width, number of bits used, etc. of one or more microtext characters. In addition, one or more bit patterns and their associated locations can be specified, wherein the bit patterns are employed to construct the one or more characters. In one embodiment, the bit patterns are specified via one or more SRE codes. The SRE codes can be embedded in the PostScript® code utilizing hexadecimal, binary, decimal, etc. representations.

Figure 6A:
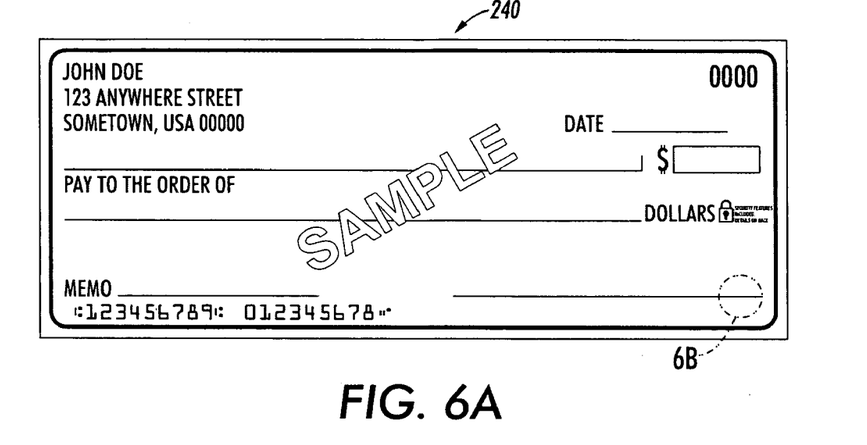
FIGS. 6A and 6B illustrate a check that employs microtext in accordance with an exemplary embodiment.
Figure 6B:
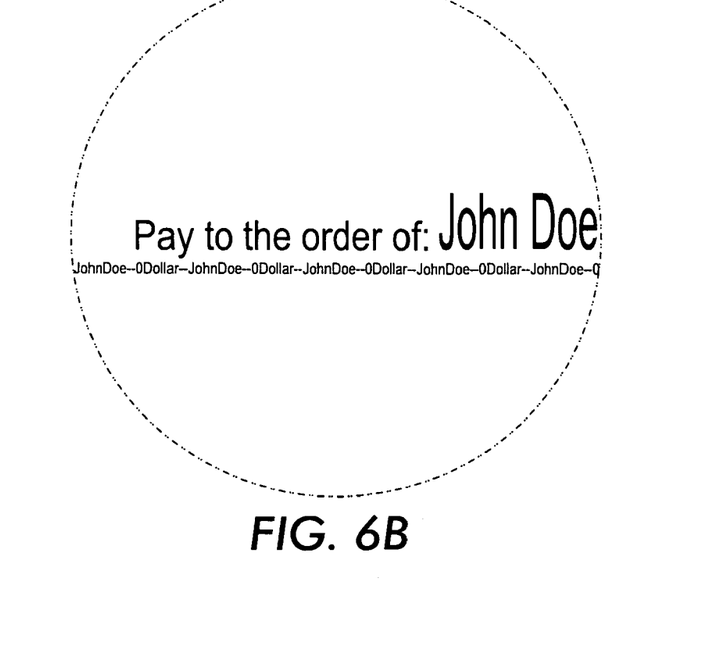

FIGS. 6A and 6B illustrate a check 240 that employs microtext 250 to provide an anti-counterfeiting measure. The check 240 includes a line wherein a drawer can endorse the instrument. As illustrated, the line can be comprised of microtext 250 that contains one or more distinguishing characteristics. In one aspect, such characteristics can verify the authenticity of an instrument. For example, the microtext 250 can comprise the endorsement line with the string "JohnDoe-0Dollar-JohnDoe-0Dollar-JohnDoe0Dollar," etc. In this manner, the name of the drawer is located on the endorsement line of the checks that he or she issues. Thus, if an unscrupulous user tries to duplicate the instrument, the microtext 250 will not be successfully copied, and the instrument can be identified as counterfeit.

Figure 7:
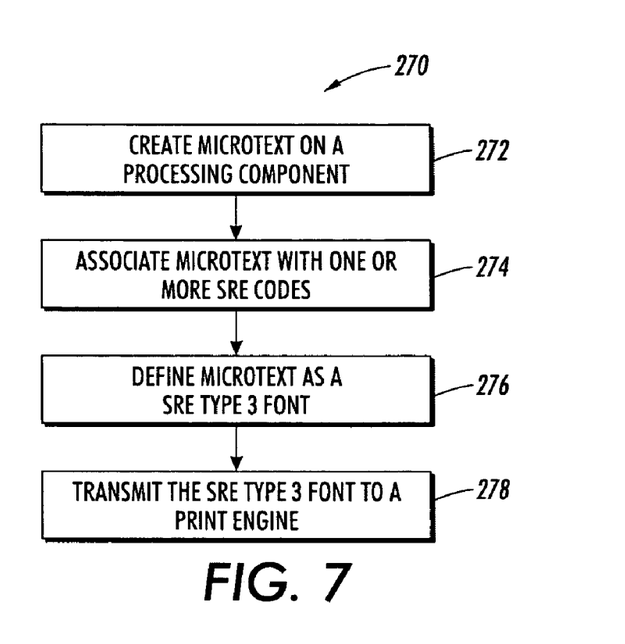
FIG. 7 illustrates a methodology to define microtext as a Type 3 SRE font in accordance with an exemplary embodiment.
Figure 8:
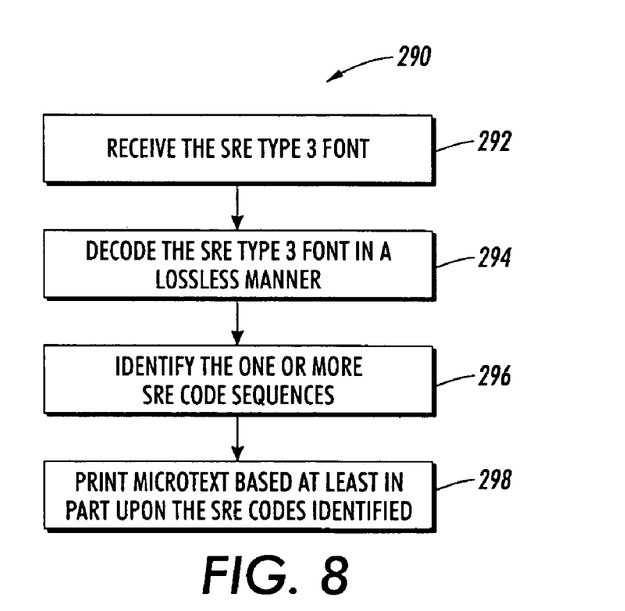
FIG. 8 illustrates a methodology to print microtext defined as a Type 3 SRE font in accordance with an exemplary embodiment.

FIGS. 7 and 8 illustrate methodologies 270 and 290 in accordance with subject embodiments. For simplicity of explanation, the methodologies are depicted and described as a series of acts. It is to be understood and appreciated that the subject embodiments are not limited by the acts illustrated and/or by the order of acts, for example acts can occur in various orders and/or concurrently, and with other acts not presented and described herein. Furthermore, not all illustrated acts may be required to implement the methodologies in accordance with the subject embodiments. In addition, those skilled in the art will understand and appreciate that the methodologies could alternatively be represented as a series of interrelated states via a state diagram or events.

FIG. 7 illustrates a methodology 270 to define microtext as a Type 3 SRE font. At reference numeral 272, microtext is created on a processing component. In one approach, microtext can be created on the processing component utilizing one or more software applications such as a word processing application, for example. In this manner, the user can create, edit, and store the microtext for subsequent retrieval. A user can also determine the location, size and type of microtext upon creation. The processing component can allow a user to transmit data associated with the microtext to one or more recipients.

At 274, the microtext is associated with one or more SRE codes. Each SRE code can represent a particular bit pattern. The bit pattern can be comprised of substantially any number of bits in any configuration. Each bit can be filled or non-filled as desired. Utilizing an SRE code can allow finer resolution of characters employed for microtext. For example, an SRE code can be an eight bit number with an associated four by four bit pattern. In this example, an eight code at six hundred dpi can represent a sixteen bit pattern at two thousand four hundred dpi.

At 276, the microtext is defined as a SRE Type 3 font. Such definition can be accomplished by incorporating the one or more SRE codes into PostScript. The PostScript® code can define the location, height, width, number of bits used, etc. of one or more microtext characters. In addition, one or more bit patterns and their associated locations can be specified, wherein the bit patterns are employed to construct the one or more characters. In one embodiment, the bit patterns are specified via one or more SRE codes. The SRE codes can be embedded in the PostScript® code utilizing hexadecimal, binary, decimal, etc. representations. At 278, the SRE Type 3 font is transmitted to a print engine.

FIG. 8 illustrates a methodology 290 to print microtext defined as an SRE Type 3 font. At reference numeral 292, a SRE Type 3 font is received. At 294, the SRE Type 3 font is decoded in a lossless manner. The SRE Type 3 font can be decoded utilizing a raster image processor or equivalent. In this manner, data employed to create a hardcopy embodiment of the microtext can be identified and gathered. At 296, one or more SRE code sequences are identified. Such SRE code sequences can be in substantially any format (e.g., decimal, binary, hexadecimal, etc.) to represent one or more microtext characters. At 298, microtext is printed based at least in part upon the SRE codes identified.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system that facilitates printing of microtext, comprising:
   a processing component that allows a user to create one or more microtext characters, wherein the characters are output as a data packet;
   an SRE code store that receives and associates one or more SRE codes with the data packet, each SRE code being of a higher level resolution that is representative of a bit pattern, wherein the bit pattern is a grid comprising a lower level number of bits that are filled to create a particular pattern representative of at least a portion of a microtext character, wherein the SRE code store employs at least one of a look-up table, an algorithm, an instruction set, a process and an application to associate the data packet with one or more SRE codes;
   a font bank that receives the one or more SRE codes from the SRE code store and defines a font in which the SRE codes are represented; and
   a raster image processor that receives the font from the font bank, decodes the font and outputs instructions to print the microtext based at least in part upon the SRE codes identified in the decoded font.

2. The system according to claim 1, further including:
   a print engine that receives the instructions from the raster image processor and outputs a hardcopy representation that includes microtext based at least in part upon the instructions received.

3. The system according to claim 1, wherein the processing component employs one or more software applications that allow a user to at least one of create, edit and store microtext.

4. The system according to claim 1, wherein the processing component is one of a personal computer, a laptop computer, a tablet computer, and a personal digital assistant.

5. The system according to claim 1, wherein:
   the SRE code is an eight bit number; and
   the bit pattern is grid that is four bits wide by four bits high, wherein each bit is a square.

6. The system according to claim 1, wherein the SRE code is an eight bit code at six hundred dots per inch that represents a sixteen bit pattern at two thousand four hundred dots per inch.

7. The system according to claim 1, wherein a character is represented by a plurality of SRE codes configured in a grid, each SRE code is a pixel, wherein the grid is at least one pixel wide by one pixel high.

8. The system according to claim 7, wherein the grid is three pixels wide by five pixels high.

9. The system according to claim 8, wherein the character is less than one point in height.

10. The system according to claim 1, wherein the one or more SRE codes are associated with at least one of a graphic and a non-text embodiment.

11. The system according to claim 1, wherein the font bank defines the one or more SRE codes as a Type 3 font via a PostScript® language.

12. The system according to claim 1, wherein the transmission of the font is lossless.

13. The system according to claim 1, wherein the instructions output from the raster image processor are in the form of an output bitmap that is based at least in part upon the SRE codes.

14. A method for defining microtext, comprising:
creating microtext on a processing component;
associating the microtext with one or more SRE codes, each SRE code being of a higher level resolution that is representative of a bit pattern, wherein the bit pattern is a grid comprising a lower level number of bits that are filled to create a particular pattern representative of at least a portion of a microtext character, wherein the SRE code store employs at least one of a look-up table, an algorithm, an instruction set, a process and an application to associate the data packet with one or more SRE codes;
defining the font in which the SRE codes are represented; and
transmitting the font to a print engine to enable the printing of microtext based at least in part upon the SRE codes identified in the defined font.

15. The method of claim 14, wherein the font is a defined as SRE Type 3, and defined by embedding data related to the microtext in a PostScript® file.

16. The method of claim 14, wherein each microtext character is created by one or more SRE codes.

17. A method for printing microtext, comprising:
receiving a SRE Type 3 font which includes information related to one or more properties of at least one microtext character;
decoding the SRE Type 3 font in a lossless manner to extract the information related to the one or more properties of the at least one microtext character;
identifying the one or more SRE code sequences, wherein each SRE code in the one or more sequences is related to a bit pattern; and
printing microtext based at least in part upon the SRE codes identified.

* * * * *